(12) United States Patent
Dawson et al.

(10) Patent No.: US 7,038,844 B2
(45) Date of Patent: May 2, 2006

(54) HIGH POWER 938 NANOMETER FIBER LASER AND AMPLIFIER

(75) Inventors: Jay W. Dawson, Livermore, CA (US); Zhi Ming Liao, Pleasanton, CA (US); Raymond J. Beach, Livermore, CA (US); Alexander D. Drobshoff, Livermore, CA (US); Stephen A. Payne, Castro Valley, CA (US); Deanna M. Pennington, Livermore, CA (US); Wolfgang Hackenberg, Munich (DE); Domenico Bonaccini Calia, Garching (DE); Luke Taylor, Montauban de Bretagne (FR)

(73) Assignee: The Regents of the University of California, Oakland, CA (US)

( * ) Notice: Subject to any disclaimer, the term of this patent is extended or adjusted under 35 U.S.C. 154(b) by 166 days.

(21) Appl. No.: 10/674,513

(22) Filed: Sep. 29, 2003

(65) Prior Publication Data

US 2005/0168804 A1 Aug. 4, 2005

(51) Int. Cl.
*H01S 3/00* (2006.01)
(52) U.S. Cl. .................................. 359/341.1
(58) Field of Classification Search ............. 359/341.1; 372/6
See application file for complete search history.

(56) References Cited

U.S. PATENT DOCUMENTS

| 5,291,501 | A | * | 3/1994 | Hanna ............................ 372/6 |
| 5,533,163 | A | | 7/1996 | Muendel |
| 5,887,097 | A | | 3/1999 | Henry et al. |
| 6,363,194 | B1 | * | 3/2002 | DiGiovanni et al. ......... 385/123 |
| 6,370,180 | B1 | * | 4/2002 | Zenteno ........................ 372/96 |
| 6,445,494 | B1 | | 9/2002 | Nilsson et al. |
| 6,483,973 | B1 | | 11/2002 | Mazzarese et al. |
| 2002/0030881 | A1 | | 3/2002 | Nilsson et al. |
| 2002/0181512 | A1 | | 12/2002 | Wang at al. |
| 2003/0021324 | A1 | | 1/2003 | Filgas |

FOREIGN PATENT DOCUMENTS

| EP | 1213802 A2 | | 6/2002 |
| EP | 1246321 A2 | | 10/2002 |
| EP | 001394909 A2 | * | 3/2004 |
| GB | 2243942 A | * | 11/1991 |

OTHER PUBLICATIONS

Dawson Jay W et al: "high power 938 nm cladding pumped fiber laser". Proceedings of SPIE, The International Society for Optical Engineering—Advances in Fiber Lasers, vol. 4974, Jan. 27, 2004 (Jan. 1, 2003), pp. 75-82, XP002321582 San Jose, CA, United States, the whole document.

(Continued)

*Primary Examiner*—Mark Hellner
(74) *Attorney, Agent, or Firm*—John P. Wooldridge; Alan H. Thompson

(57) ABSTRACT

An optical fiber amplifier includes a length of silica optical fiber having a core doped with neodymium, a first cladding and a second cladding each with succeeding lower refractive indices, where the first cladding diameter is less than 10 times the diameter of the core. The doping concentration of the neodymium is chosen so that the small signal absorption for 816 nm light traveling within the core is less than 15 dB/m above the other fiber losses. The amplifier is optically pumped with one laser into the fiber core and with another laser into the first cladding.

20 Claims, 10 Drawing Sheets

OTHER PUBLICATIONS

Zenteno L.A. et al: "W single-transverse-mode Yb-doped double-clad fibre laser at 978 nm" Electronics Letters, IEEE Stevenage, GB, vol. 37, No. 13, Jun. 21, 2001 (Jun. 21, 2001), pp. 819-820, XP006016776, ISSN: 0013-5194 cited in the application the whole document.

Jeong H. et al: "Continuous wave single transverse mode laser oscillation in a Nd-doped large core double clad fiber cavity with concatenated adiabatic tapers", Optics Communications, North-Holland Publishing Co. Amsterdam, NL, vol. 213, No. 1-3, Nov. 15, 2002 (Nov. 15, 2002), pp. 33-37, XP004391491, ISSN: 0030-4018, p. 34; figure 1.

Hayward R.A. et al: "Efficient cladding-pumped Tm-doped silica fibre laser with high power singlemode output at 2 µ m", Electronics Letters, IEE Stevenage, GB, vol. 36, No. 8, Apr. 13, 2000 (Apr. 13, 2000), pp. 711-712, XP006015130, ISSN: 0013-5194, pp. 711, left-handed column, line 34—line 36.

Galvanauskas A. et al: "Millijoule femtosecond all-fiber system". Conference On Lasers and Electro-Optics. (Cleo 2001). Technical Digest. Postconference Edition. Baltimore, MD, May 6-11, 2001, Trends in Optics and Photonics. (TOPS), US, Washington, WA: OSA, US, vol. vol. 56, May 6, 2001 (May 6, 2001), pp. 1-2, XP0010559483. ISBN: 1-55752-662-1, p. 1, left-hand column; figure 2.

Philippe L. et al: "Experimental study of pump power absorption along rare-earth-doped double clad optical fibres". Optics Communications, North-Holland Publishing Co., Amsterdam, NL, vol. 218, No. 4-6, Apr. 2003 (Apr. 1, 2003), pp. 249-254, XP004416676, ISSN: 0030-4018, table 1.

* cited by examiner

HIGH POWER 938 NANOMETER FIBER LASER AND AMPLIFIER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to fiber lasers and amplifiers, and more specifically, it relates to a cladding pumped fiber amplifier capable of watt level output powers and that can amplify narrow band laser sources.

2. Description of Related Art

This fiber amplifier was developed as part of a sum frequency mixing laser system designed to generate 589 nm light for laser guide star applications at Lawrence Livermore National Laboratory. The other laser source at 1583 nm was constructed entirely of commercially available components. The 938 nm amplifier has required significant development to bring to realization. In the course of this development, the present inventors have created a novel device not previously described elsewhere. The goal is to achieve a compact reliable source of narrow bandwidth laser light at 938 nm with output powers exceeding 10 W.

Utilizing the Nd-doped optical fiber made with standard commercial techniques, the present inventors constructed a 938 nm optical fiber amplifier which achieved 2.1 W of output power at 938 nm with 20 W of coupled pump power at 800 nm and cooled to liquid nitrogen temperatures. This was the highest power 938 nm fiber amplifier constructed to date, but it is still inadequate for many important tasks. The present inventors have developed a higher power 938 nm amplifier that can be scaled to very high and which operates at room temperature.

SUMMARY OF THE INVENTION

It is an object of the present invention to provide a new 938 nm fiber laser and amplifier.

It is another object to provide a 938 nm fiber laser and amplifier that can be scaled to very high power (exceeding 10 W).

Still another object is to provide a high power 938 nm fiber amplifier that operates at room temperature.

Another object is to provide a high power 938 nm fiber laser that operates at room temperature.

These and other objects will be apparent based on the disclosure herein.

The present invention is a fiber laser/amplifier that works in 930–950 nm region of the wavelength spectrum. This amplifier is based on Neodymium doped, germanium co-doped silica glass. The laser is cladding pumped and capable of watt level output powers and can amplify narrow band laser sources. Previous fiber laser amplifiers in this wavelength spectrum emitted less than 100 mW of optical power. The present inventors have overcome this limitation. This device can be used in sum-frequency mixing schemes with 1583 nm lasers to generate 589 nm light useful for laser guide stars for adaptive optics on large telescopes. It can also be directly frequency doubled to provide a high quality blue laser source. Finally, the device is directly useful as a high brightness pump laser source for other fiber laser amplifiers such as Ytterbium.

DETAILED DESCRIPTION OF THE INVENTION

The present invention is a scalable 938 nm optical fiber laser/amplifier that operates at room temperature and is capable of amplifying narrow bandwidth light. Embodiments of the invention provide a high power optical amplifier at 938 nm, scalable to 100 W CW; room temperature operation; amplification of narrow bandwidth (<500 MHz) continuous wave optical signals without detrimental non-linear parasitic interference from stimulated Brillouin scattering; suppression or elimination of parasitic amplified spontaneous emission at 1088 nm; and efficient use of pump power.

The table below provides an exemplary embodiment of the fiber employed in an amplifier.

TABLE 1

Nd Amplifier Fiber Specification

| Parameter | Units | Min | Nominal | Max |
| --- | --- | --- | --- | --- |
| Core numerical aperture | — | 0.05 | 0.06 | 0.07 |
| Core diameter | μm | 28 | 29 | 30 |
| Background attenuation at 980 nm | dB/km | | 20 | 30 |
| Nd absorption in core at 800 nm | dB/m | 6 | 7 | 8 |
| Multi-mode pump cladding diameter | μm | 120 | 125 | 130 |
| Pump cladding numerical aperture | — | | 0.4 | 0.45 |
| Background loss of pump cladding at 980 nm | dB/km | | | 15 |
| Operating temperature range | C | −40 | 25 | 80 |

In addition to the above specifications the following three items will be required of the fiber in the exemplary embodiment 1. The pump cladding geometry is constructed such that the circular symmetry of the pump clad is broken in a way that is consistent with induction of mode mixing of the pump light, while minimizing passive and bend losses of the pump light A hexagonal cladding geometry has proven effective.

2. The core composition is Neodymium doped silica co-oped with germania, but NOT co-doped with aluminum or phosphorous.

3. The fiber is proof tested such that mechanical reliability is assured when the fiber is deployed in a configuration where it is bent around a 50 mm diameter spool for its entire length.

The following table details the amplifier parameters.

TABLE 2

Calculated Parameters for the Amplifier System

| Calculated quantity for amplifier system | Units | Min | Nominal | Max |
|---|---|---|---|---|
| Optimum amplifier length | m | | 16.5 | |
| 980 nm background loss at optimum length | dB | | 0.66 | 1.16 |
| Pump clad background loss | dB | | | 0.2493 |
| Optimum bend radius | mm | 24 | 39 | 39 |

Figure 1:
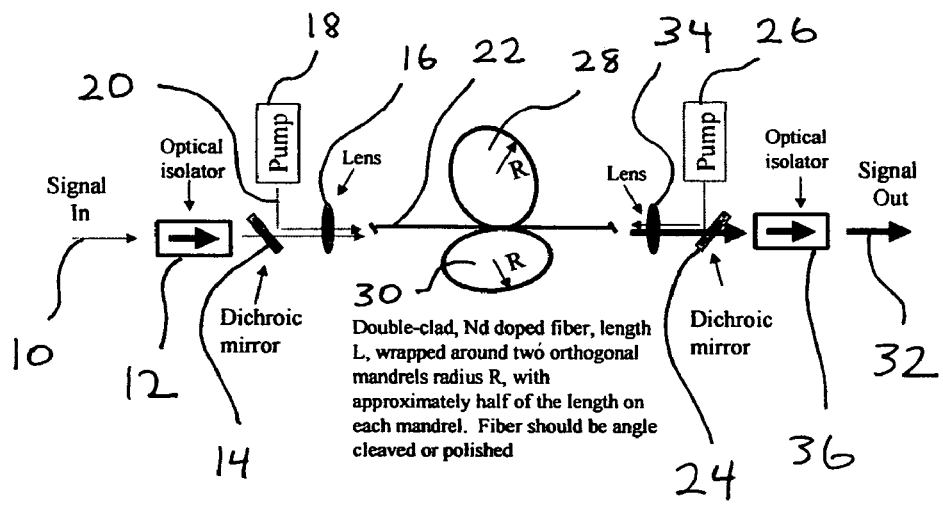
FIG. 1 shows a schematic of 938 nm fiber amplifier.

A schematic of the fiber amplifier is shown in FIG. 1. In the figure, a 930–950 nm signal 10 to be amplified enters the amplifier from the left hand side of the figure. The signal is propagated through an optical isolator 12, which helps to prevent excess amplified spontaneous emission from building up in the amplifier, travels through a dichroic mirror 14 which is designed for low transmission loss of the signal light, while being highly reflective in the pump band (816 nm, but 808 nm or 800 nm will also work). The signal is then optimally focused into the core of the optical fiber using a lens 16 with a focal length appropriate for the beam size and core size of the fiber, the calculation of which is well known in the state of the art Pump laser 18 provides approximately 25 W of pump light 20 at 816 nm, which is combined with the signal light in the dichroic mirror 14. The pump source is preferably a LIMO packaged laser diode array with a focal spot size of 200 µm at 0.22 NA. The focal lens is chosen to provide good coupling for the pump beam into the cladding of fiber 22 as well as providing good mode matching of the signal beam to the fiber core. It should be noted that this constraint may require the addition of a telescope at the signal input in order to correctly size the signal beam so that one lens can be employed for both purposes. Other means of combining the pump and signal beam may also be employed. The fiber into which the light is being coupled may be the fiber detailed in table 1 and 2 above. The present inventors were able to have a fiber made to this specification by Nufern of East Granby, Conn. A second dichroic mirror 24 similar to the first is placed at the output of the amplifier. A second pump diode module 26 identical to the first is used to couple an additional 25 W of pump power into the fiber such that this pump power is counter-propagating to the signal. The fiber is wound on a set of orthogonal mandrels 28, 30 of radius R, such that half of the length of fiber is wound on each of the two mandrels. The radius R of each mandrel is chosen such that there is significant loss (e.g., >10 dB) to light propagating at 1088 nm in the fiber core while minimal loss (e.g., <1 dB) induced to signal light at 938 nm propagating in the fiber core. The bend loss of the fiber as a function of wavelength is a well-known relationship relative to the fiber core size and numerical aperture and is discussed in greater detail below. An additional feature of the amplifier configuration is that the ends of the fiber are angle cleaved or polished at an angle of, e.g., >8 degrees in order to eliminate multiple reflections in the amplifying fiber. Pump light is absorbed by the core of the fiber and converted to signal light via stimulated emission of the Neodymium ion population. The amplified signal 32 exits the fiber, is collimated by the focusing lens 34, traverses the dichroic mirror 24 and exits the amplifier through the second optical isolator 36.

Depending on the specific application needs in which the amplifier is to be employed, one skilled in the art may recognize that this amplifier configuration can be modified to simplify it via the removal of some components or via the replacement of components with other components that perform essentially the same function. For example, one or more of the isolators may be eliminated if it can be assured there will be no parasitic back reflections into the system or an alternative means of combining the pump and signal beam could be devised. Further, more or less pump light may be coupled into the cladding of the fiber depending on the specific application's overall power requirement. At its essence, this invention consists of a neodymium doped optical fiber, e.g., as described in Table 1, which is packaged in a way to provide bend induced loss at 1088 nm while permitting low losses at 938 nm and operates at room temperature. Alternatively, some performance improvements may be gained by lowering the operating temperature of the amplifier, e.g., to 195 K, and further improvements may be gained by operating at a much lower temperature, e.g., 77 K. However, the amplifier will function well at room temperature.

Rationale For Optical Fiber Specification

Core diameter and numerical aperture:

It is desirable that the core to be large to minimize non-linear effects and maximize overlap with the pump cladding, thus maximizing the absorption. It is also desirable that the numerical aperture of the core is low to maximize bend loss and minimize guiding of higher order modes.

Speaking to the last issue first, the core diameter and NA selected for one embodiment corresponds to a "V" number of about 6 at the signal wavelength, which will result in guiding of about 7 waveguide modes. However, the fiber bending is done in order to create high loss in the fundamental mode at 1088 nm (see below), which will correspond to even higher loss in the more weakly guided higher order modes. Thus, they will be strongly attenuated by bending at all wavelengths. Finally, the present inventors have demonstrated successful robust guiding of the fundamental mode at 1064 nm in an equivalent Yb doped step index fiber. There are also numerous reports of similar cores yielding guiding over the required lengths with good $M^2$ at the end of the guided length. The core is nominally multi-mode; however, operation is desirable in a regime of stable single mode operation.

Figure 2:
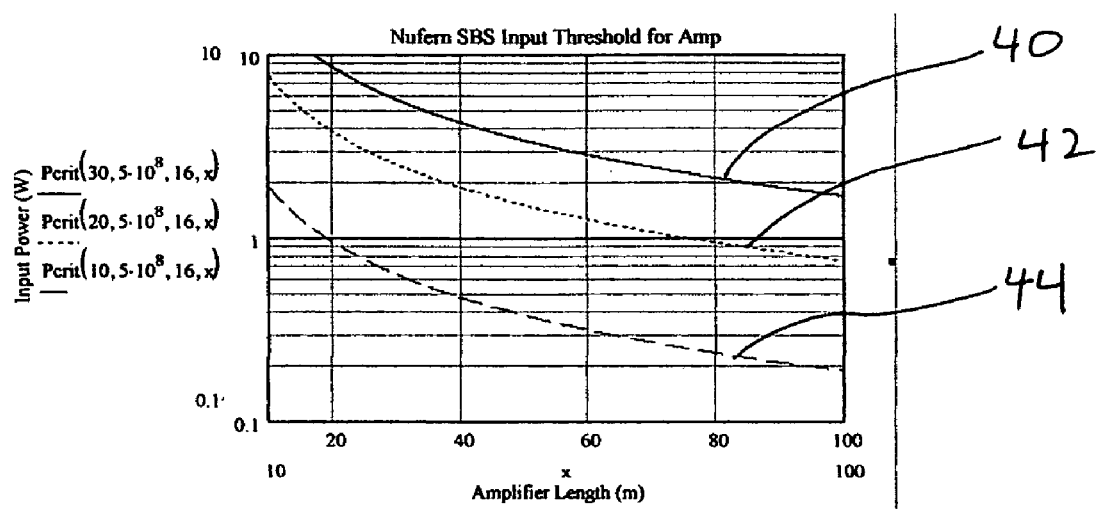
FIG. 2 shows a SBS plot where the x-axis is the amplifier length in m and the y-axis is the input optical power at which SBS should occur in Watts.

The primary non-linear effect of concern with this amplifier is Stimulated Brillouin Scattering (SBS), which occurs primarily for narrow bandwidth optical signals. FIG. 2 below plots the input power at which SBS becomes a problem for an amplifier with at gain of 16 dB and a signal bandwidth of 500 MHz (the maximum for the Guidestar application).

In the SBS plot of FIG. 2, the x-xis is the amplifier length in m, the y-axis is the input optical power at which SBS should occur in Watts. Line 40 is for a 30 μm diameter core, line 42 is for a 20 μm diameter core and line 44 for a 10 μm diameter core. The gain is 40, so the output power would be 40× the input power. As seen from the figure, the 30 μm core diameter will permit up to 3 W of input power for a 16 dB gain amplifier, which implies up to 120 W of output power is possible for a 50 m long amplifier. This more than exceeds the 10 W need for the Guidestar application and creates the potential for significant scaling.

Figure 3:
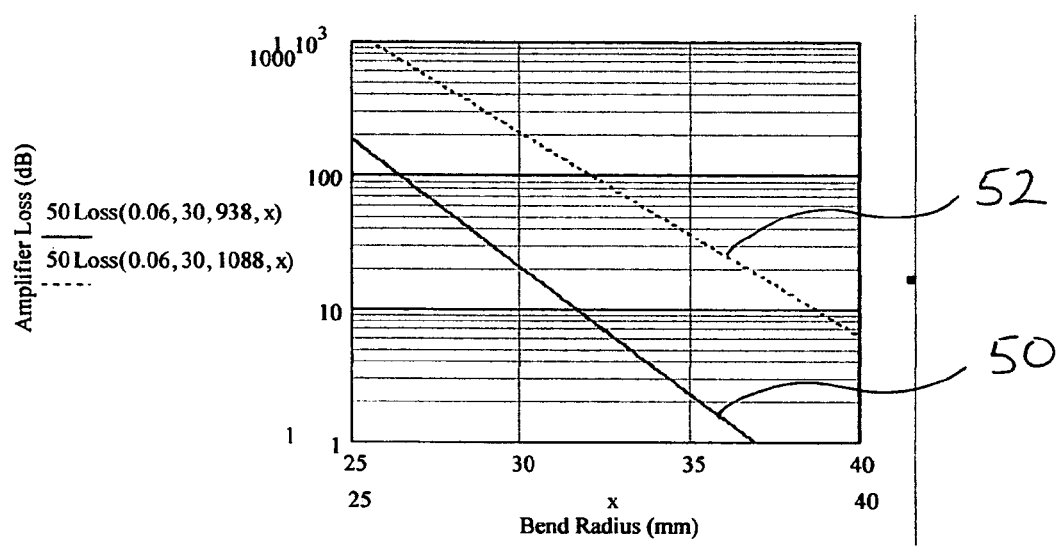
FIG. 3 shows the total amplifier bend induced (y-axis, dB) loss vs. bend radius (x-axis, mm).

The effect of core diameter and numerical aperture on bend loss is quite well known. FIG. 3 shows the expected bend loss of a present fiber design as a function of bend radius for a 50 m amplifier with a core size of 30 μm and a numerical aperture of 0.06. In the figure, the y-axis represents the total amplifier bend induced loss (in dB) and the x-axis represents bend radius (mm). Line 50 corresponds to 938 nm light propagating in the core and line 52 corresponds to 1088 nm light propagating in the core.

FIG. 3 basically shows that it is theoretically possible to get a loss of >10 dB at 1088 nm and <0.5 dB at 938 nm within the amplifier length by employing a bend radius in the range of 37–39 mm. FIG. 3 is based on the bend loss model presented in Jeunhomme's book on Single-Mode Fiber Optics. This model has agreed well with the present inventors' experimental results on other fibers. Note that the approximation employed is claimed to be good to 3% only for $2>\lambda/\lambda_c>0.8$ and $\lambda/\lambda_c$ is in the range of 0.4–0.6 for this calculation. Thus, some deviation is expected within the experimental results from this behavior. However, data from existing fibers shows reasonable correlation still exists with an equivalent to the proposed core. The bend radii, as shown in FIG. 3, was chosen to make the bend induced losses with wavelength as similar as possible. Another conclusion drawn from FIG. 3 is that it is probable that by using the core diameter and numerical aperture from the specification, wavelength dependent bend losses are achievable that are comparable with current amplifier fibers at bend radii that will not attenuate the pump. The pump experiences significant losses at bend radii less than 30 μm in the present fiber.

The analysis presented above justifies the selected core diameter and numerical aperture in that the core will have (1) essentially single mode operation in the deployed condition, thus ensuring good beam quality, (2) a large enough effective area to avoid SBS at the power levels and fiber lengths deployed in the amplifier, and (3) wavelength dependent bend induced losses comparable to currently available fibers at bend radii that will not attenuate the pump propagating within the cladding.

Core Background Attenuation

The background attenuation of rare earth doped fibers is quite high compared to standard single mode optical fiber and is strongly wavelength dependent (following a $1/\lambda^4$ dependence). Background attenuation rises with increasing core size. A good amplifier will require low passive losses. Thus, the specification of the core diameter is made as small as possible in the present invention.

Nd Absorption in a Core at 800 nm

Figure 4:
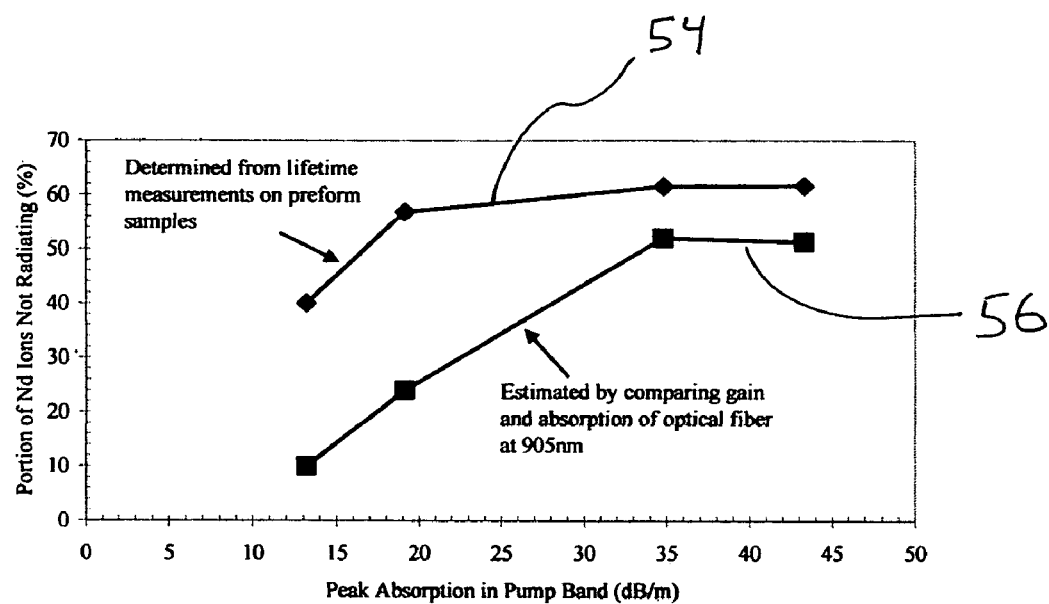
FIG. 4 shows the portion of Nd ions that are quenched as a percentage of the total ion population for several sample fibers.

The core absorption at 800 nm is the simplest way to specify the desired concentration of Nd ions in the core. Significant quenching occurs in prior art materials composition. FIG. 4 plots the degree of quenching as a function of pump absorption. The figure shows the portion of Nd ions that are quenched as a percentage of the total ion population for several sample fibers. The top line (54) is based on lifetime measurements from the fiber preform and the lower line (56) is based on comparing the measured small signal gain at 905 nm to the measured loss at 905 nm. It is seen from FIG. 4 that 6–8 dB/m of absorption should show almost no quenching. As shown in Table 3, lowering the core absorption while raising the core size to permit a shorter amplifier is the key to making the fiber operate as an amplifier at room temperature rather than at 77 K.

TABLE 3

| Parameter | Prior Art Fiber | Redesigned fiber |
|---|---|---|
| Alpha @ 810 nm (dB/m) | 19.1 | 5 |
| Alpha @ 938 nm (dB/m) | 0.84 | 0.252 |
| Alpha @ 905 nm (dB/m) | 7.45 | 2.212 |
| gstar @ 938 nm (dB/m) | 3.5 | 1.12 |
| gstar @ 1088 nm (dB/m) | 6.9 | 2.16 |
| gstar @ 905 nm (dB/m) | 5.86 | 2.048 |
| Optimum Amplifier Length (m) | 200 | 40 |
| Inversion at 77 K (Liquid Nitrogen) | 0.0229 | 0.358 |
| Gain at 938 nm @ 77 K (dB) | 16.03 | 16.0384 |
| Gain at 1088 nm @ 77 K (dB) | 31.602 | 30.9312 |
| Gain at 905 nm @ 77 K (dB) | 26.8388 | 29.32736 |
| Inversion at 195 K (Dry Ice) | 0.1006 | 0.406 |
| Gain at 938 nm @ 195 K (dB) | 16.024288 | 16.0332928 |
| Gain at 1088 nm @ 195 K (dB) | 138.828 | 35.0784 |
| Gain at 905 nm @ 195 K (dB) | UNK | UNK |
| Inversion at 293 K (Room Temperature) | 0.212 | 0.476 |
| Gain at 938 nm @ 293 K (dB) | 16.016 | 16.04288 |
| Gain at 1088 nm @ 293 K (dB) | 292.56 | 41.1264 |
| Gain at 905 nm @ 293 K (dB) | −925.656 | −7.3696 |
| Change in Gain at 1088 nm between room temperature and K for constant 16 dB gain at 938 nm. | 260.958 | 10.1952 |

Table 3 is a comparison of amplifier gain at 938 nm and 1088 nm for a standard single mode fiber and an embodiment of a present invention fiber as specified in Table 1 above. Table 3 uses measured absorptions and gains as a function of temperature to show a prior art amplifier needs to be operated at 77 K to be an amplifier at 938 nm, while the present improved fiber will operate as an amplifier at room temperature. Basically, at room temperature, one must operate at high inversion in order to achieve transparency at 938 nm, while the 1088 nm line is transparent at no inversion. At liquid nitrogen temperatures, the 938 nm line becomes transparent at no inversion also. Thus the two fibers function the same at 77 K, however at room temperature, the standard fiber has nearly 300 dB of gain at 1088 nm in order to achieve 16 dB of gain at 938 nm. Meanwhile, the redesigned fiber, because of its lower doping and shorter length, has only 41 dB of gain at 1088 nm for 16 dB of gain at 938 nm. 200 dB of gain is huge and basically the amplifier will oscillate at 1088 nm, preventing amplification at 938 nm for the standard fiber. The redesigned fiber has only 41 dB of gain at 1088 nm, which can be suppressed using bend loss discussed above and angle cleaves on the fiber end-faces to suppress back-reflections.

Pump Cladding Diameter and Numerical Aperture

Now that the core diameter, Nd concentration and power conversion efficiency have been established, the pump cladding and numerical aperture can be defined. Two requirements for these values must be satisfied. The pump cladding diameter must be small enough so that the effective absorption of the pump light into the core will permit absorption of all light within a length of 50 m or less. The pump cladding and numerical aperture must be large enough so that enough pump power can be coupled into pump cladding to achieve the desired output power at the planned power conversion efficiency.

Figure 5A:
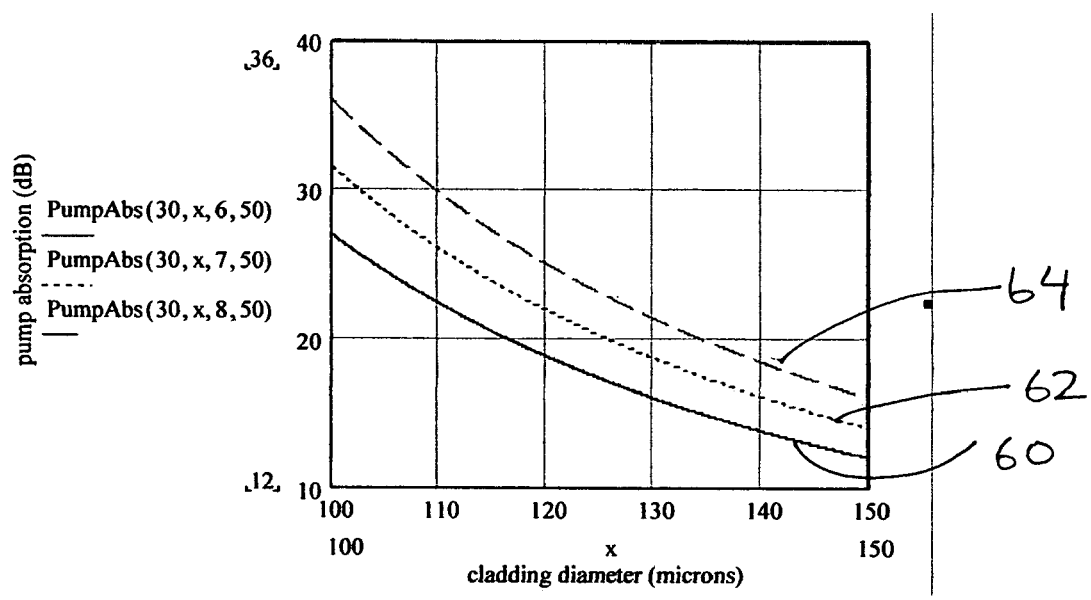
FIG. 5A shows the pump absorption by the core (y-axis, dB) of a 50 m amplifier vs. pump cladding diameter (x-axis, μm) for a core with 30 mm diameter.

Clearly the pump cladding diameter should be set at the maximum value that satisfies objective 1 and then the pump numerical aperture is adjusted to permit coupling of the required amount of pump power. The present inventors estimated the required amount of pump power to be 100 W. FIG. 5A below shows the absorption of a 50 m amplifier as a function of pump cladding diameter. In the figure, pump absorption by the core is shown in dB on the y-axis for a 50 m amplifier vs. pump cladding diameter shown in µm on the x-axis for a core with 30 mm diameter. The core Nd absorption at the pump wavelength is 6 dB/m (line 60), 7 dB/m (line 62) and 8 dB/m (line 64) respectively. It is seen from FIG. 5A that if the pump cladding diameter is set in the range of 120–130 µm, a pump absorption of 15–25 dB in 50 m is achieved. This is consistent with the pump absorption of the prior art amplifiers and with the fiber length assumed in other calculations justifying the core size and numerical aperture.

Figure 5B:
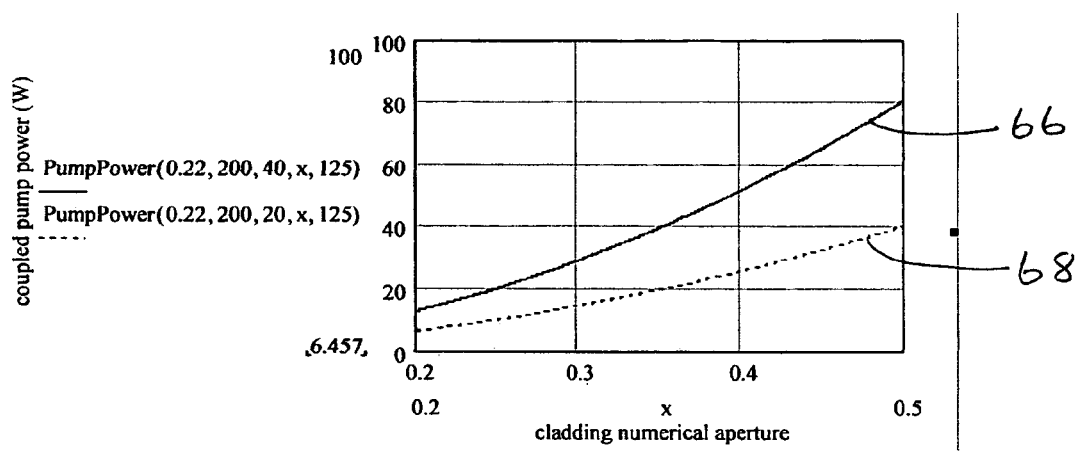
FIG. 5B shows the maximum power in pump cladding (y-axis, W) vs. pump cladding NA (x-axis, dimensionless).

FIG. 5B shows the maximum power in pump cladding (y-axis, W) vs. pump cladding NA (x-axis, dimensionless). Line 66 assumes a fiber coupled diode array brightness on the order of the best that is presently commercially available (Boston Laser, Polychrome module) and line 68 assumes a brightness comparable to the inventors' in house modules (LIMO).

Figure 6:
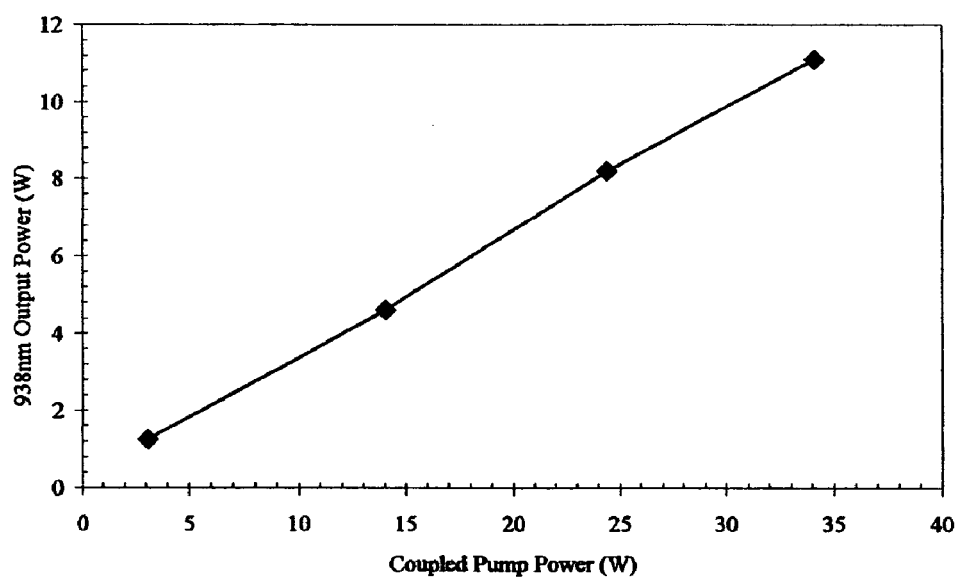
FIG. 6 shows the output power at 938 nm from an example amplifier

Attention should be given to the amount of pump power that could be coupled into this pump cladding. FIG. 6 plots coupled pump power vs numerical aperture for a pump core size of 125 µm.

The present inventors were able to pump >50 W into the end face of the amplifier fiber using a minimum pump clad NA of 0.4 for the best devices commercially available, which implies >100 W could be coupled into the fiber via pumping from both ends. A pump clad NA of 0.45 would theoretically permit our standard lower cost commercially available fiber coupled pump diode arrays to achieve the required input power discussed in the embodiment of 25 W/end-face discussed above.

Reduction to Practice

The present inventors have performed initial tests on a 938 nm fiber obtained from Nufern Specialty Fiber that was redesigned according to the present invention. The fiber had a 28 µm core diameter, a 0.057 core NA, a 120 µm pump cladding diameter, a cladding NA of 0.47 and a core absorption due to $Nd^{3+}$ of 4.7 dB/m at 810 nm. The present inventors set up a single stage fiber amplifier using 25 m of fiber, with 1.4 W of launched 938 nm signal light and 35 W of 808 nm pump light counter-propagating to the signal in the cladding. The fiber amplifier was operated at room temperature and no filtering was employed to eliminate 1088 nm ASE. The source light was also not modulated to reduce SBS. The present inventors got 11 W of amplified signal light with all of the power in the 938 nm line and no significant ASE at 1088 nm. Thus our new fiber design has exceeded our expectations and operated at room temperature at 938 nm without requiring ASE filtering to reduce the 1088 nm parasitic.

Previously using standard commercial fibers the present inventors obtained only 2 W of 938 nm output using a 600 mW 938 nm broadband signal, 2 full amplifier stages with 300 m of total fiber and two 25 W 808 nm pumps. In addition, both stages had to be cooled to 77 K and bend loss and spectral source broadening had to be employed.

The new fiber is shorter and has a larger core, indicating that the SBS threshold will be high None of the power conversion efficiency issues observed previously, such as quenched ions and high passive losses, have been found in the new fiber. Given the high SBS threshold of this fiber, scaling to 50 W is a simple matter of purchasing higher brightness pump laser diodes, which have recently become available. This fiber amplifier can be employed to generate a 10 W average power signal using the preferred pulse format for elimination of spot elongation (3 µs pulse, 60 µs period). The latter pulse format would simplify sum frequency mixing issues. A plot of the output power vs. pump current is shown in FIG. 6. Output power at 938 nm was measured through a short pass filter with a 1 µm cut off wavelength.

Figure 7:
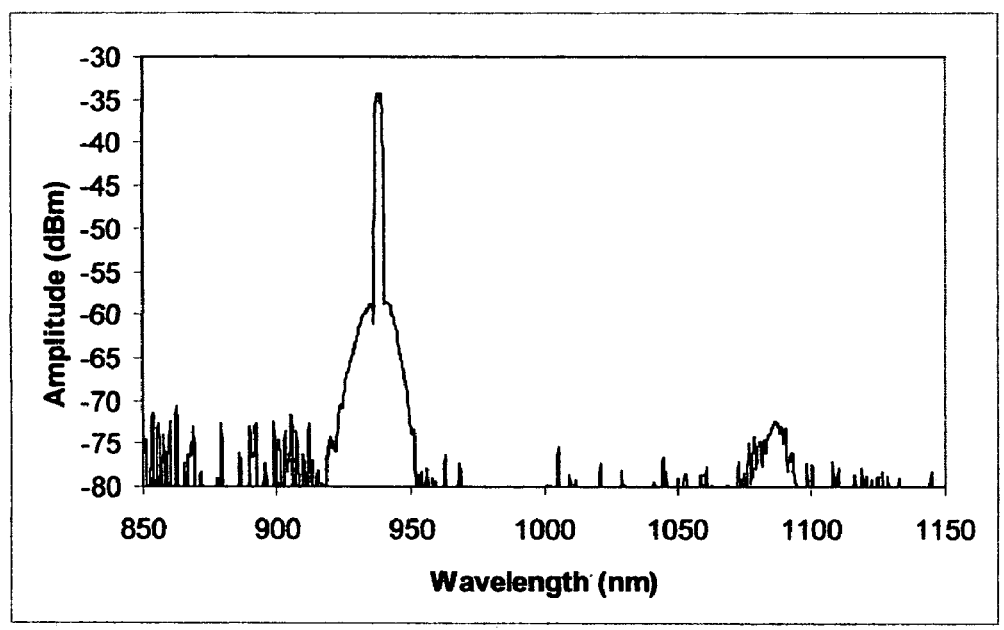
FIG. 7 shows the output spectrum of the 938 nm amplifier at 11 W output (at room temperature) with no filters, and a 1 nm resolution bandwidth.

A plot of the output power vs. wavelength is shown in FIG. 7. The output spectrum of the 938 nm amplifier was 11 W output at room temperature with no filters, 1 nm resolution bandwidth.

In an exemplary reduction to practice of the present invention, 11 W of 938 nm light was produced in an $Nd^{3+}$ fiber laser. Optimization of the ratio of the fiber core and cladding areas permitted operation of the laser at room temperature by minimizing 1088 nm gain.

It has long been a challenge to achieve high power laser or amplifier operation of the $^4F_{3/2}-^4I_{9/2}$ transition of neodymium based laser media because of the 3-level nature of the transition and competition from the $^4F_{3/2}-^4I_{11/2}$ 4-level transition. Multi-watt operation on this transition has recently been achieved in crystal hosts such as YAG and $YVO_4$ [1]. However, laser or amplifier operation of the $^4F_{3/2}-^4I_{9/2}$ transition in glass hosts or optical fiber hosts was limited to power ranges on the order of 100 mW due to the difficulties inherent in cladding pumping a 3-level laser system with a competing 4-level transition [2]. Silica glass hosts offer many advantages over their crystal counterparts, such as broader tuning ranges (900 nm to 950 nm) and for specific material compositions, more favorable branching ratios for the $^4F_{3/2}-^4I_{9/2}$ transition [2].

There are a number of challenges to be overcome in order to get high power operation of the $^4F_{3/2}-^4I_{9/2}$ transition in an optical fiber. Because the desired 34-level transition is competing with an undesired 4-level transition, pumping to transparency guarantees large gain in an undesired wavelength band. However, the materials with the best branching ratios into the $^4F_{3/2}-^4I_{9/2}$ transition (nearly pure fused silica) are also the ones into which neodymium is the least soluble. This increases the attractiveness for an optical fiber host due to the potential of long interaction lengths, which are preferred for low doping concentrations. The present inventors have produced an $Nd^{3+}$ fiber laser that had achieved an output power of 2.1 W via cladding pumping by reducing the operating temperature of the amplifier to 77K [3]. The extremely low operating temperature depopulated the higher levels of the ground state of the $Nd^{3+}$ ion and effectively made the amplifier at 4-level system at 938 nm, which permitted it to compete effectively with the 1088 nm gain peak.

The present inventors completed a detailed study of the $Nd^{3+}$ fiber laser system, which led them to a fiber design space in which it is possible to achieve significant gain in the 900 nm band while maintaining a controllable level of gain in the 1088 nm band. The basic concept is that as the ratio of the core area to the cladding area is reduced the absorption of the pump from the cladding is increased. The combination of a short amplifier with a high pump laser flux leads to high average inversion of the $Nd^{3+}$ ion population. This in turn minimizes the difference in gain between 938 nm and 1088 nm.

Figure 8:
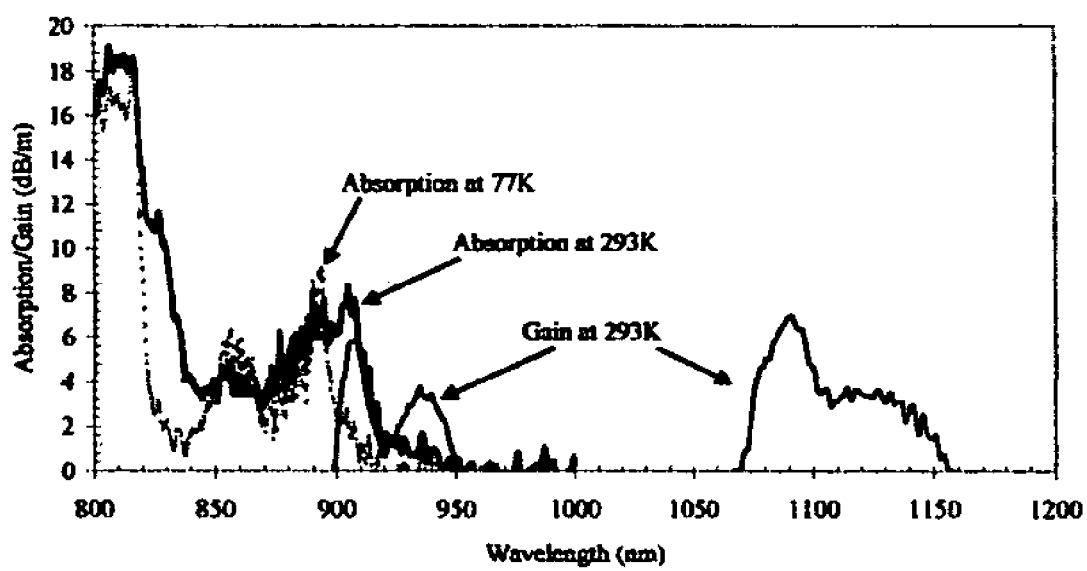
FIG. 8 shows the Giles parameters for an optical fiber with a core of only germanium, neodymium and silica.

FIG. 8 shows a plot of the Giles parameters [6] for a $Nd^{3+}$ fiber sample, which contained only germanium, neodymium and silica in the core. This is the core material composition that gives the best branching ratio for the 900 nm wavelength band. The Giles parameters are a measure of the small signal absorption and gain due to the $Nd^{3+}$ ions per unit length of fiber under the assumption of all electrons in the ground state (absorption) and all electrons in the upper level laser state (gain). FIG. 8 also shows the small signal absorption at 77 K. These parameters were measured from the original fiber [3] that has the same core composition as the fiber used in the exemplary 11 W laser. The 11 W fiber had a peak absorption of 4 dB/m at 810 nm and in the modeling, the parameters were simply scaled from FIG. 8 by 4/19 to get parameters for the 11 W fiber.

To calculate the net amplifier gain at a specific wavelength, the "average inversion" model was used. So amplifier gain is $$\text{Gain} = g^* n_{avg} L - \alpha(1-n_{avg})L \quad (1)$$

Where g* is the Giles parameter gain at the wavelength of interest, α is the absorption at the wavelength of interest, L is the amplifier length and $n_{avg}$ is the "average inversion" of the amplifier. The inventors were interested in how the amplifier would perform at 1088 nm and 905 nm (the 900 nm gain peak) as a function of gain at 938 nm. Estimates are shown of the inventors' former [3] and current amplifier in Table 4 below.

TABLE 4

Amplifier gain at specific wavelengths for the current 11 W amplifier and a former amplifier with a standard design [3]

| Parameter | Ref. 3 fiber (7.5 μm core, 200 μm cladding, 19 dB/m absorption at 810 nm in core, 200 m length) | New 3 fiber (30 μm core, 125 μm cladding, 4 dB/m absorption at 810 nm in core, 25 m length |
|---|---|---|
| Gain at 938 nm @ 77 K (dB) | 10.1 | 10.1 |
| Gain at 1088 nm @ 77 K (dB) | 19.9 | 19.5 |
| Gain at 905 nm @ 77 K (dB) | 16.9 | 18.4 |
| Gain at 938 nm @ 293 K (dB) | 10.0 | 10.1 |
| Gain at 1088 nm @ 293 K (dB | 283.0 | 23.8 |
| Gain at 905 nm @ 293 K (dB) | −944.0 | 2.6 |

Table 4 shows that while the former fiber performed well at 77 K, it had no hope as a room temperature amplifier as the gain at 1088 nm at room temperature for a factor of 10 gain at 938 nm is approximately 1028. However by modifying the fiber design such that the core was increased to 30 μm and the cladding reduced to 125 μm, an optimum amplifier length of 25 m absorbed 78% of the pump light and has a gain of 250 at 1088 nm for a gain of 10 at 938 nm. This level of gain can be suppressed by careful amplifier design.

Figure 9:
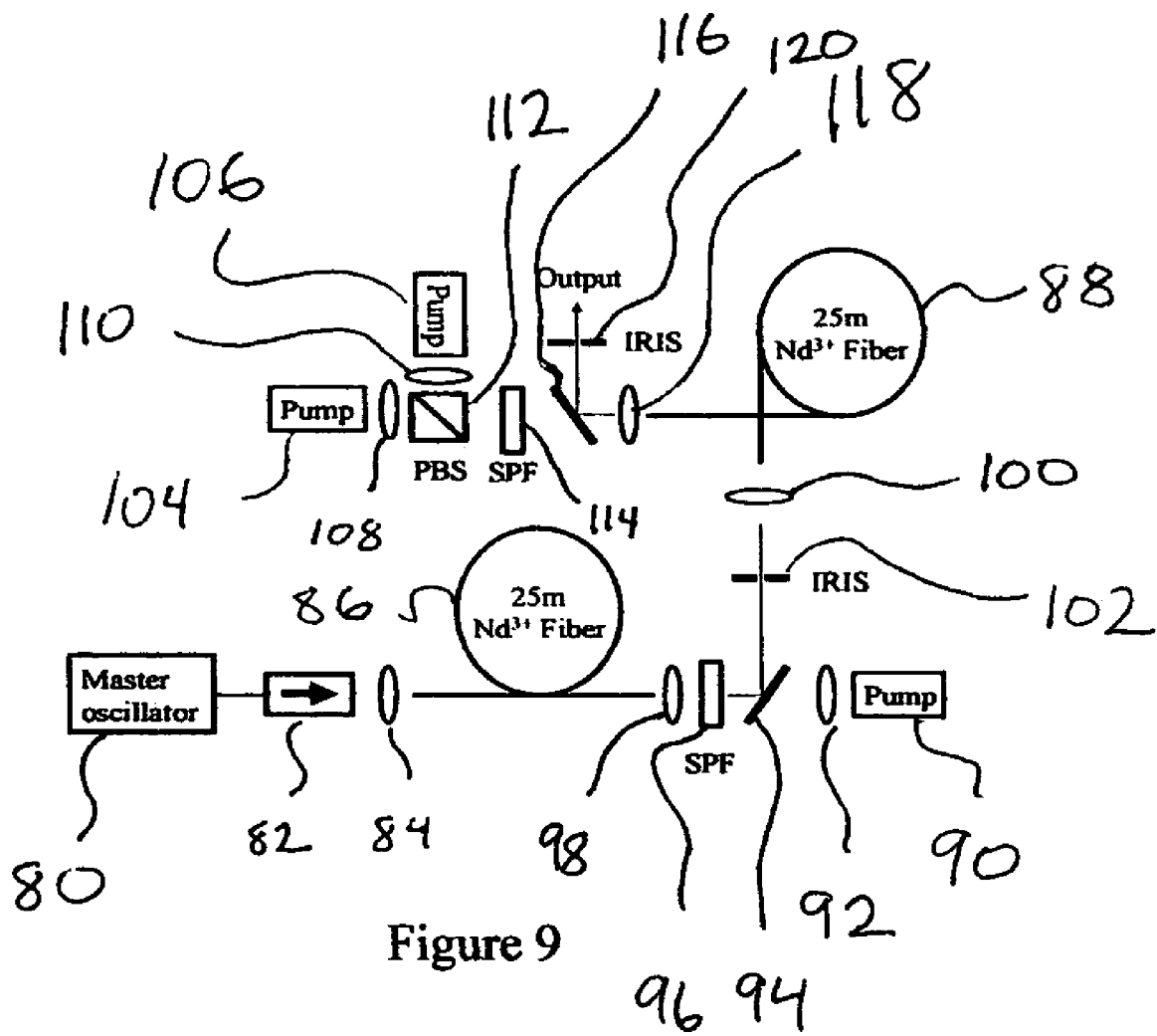
FIG. 9 is a schematic of an embodiment of the fiber laser.

A fiber was purchased from Nufern that had a 30 μm diameter and 0.06 NA core with a 125 μm hexagonal cladding. The polymer coating was designed to turn the cladding into a waveguide for the pump beam and had an NA of 0.45. The absorption due to the $Nd^{3+}$ ions in the core of the fiber was 4 dB/m at 810 nm. The experimental set-up (FIG. 9) consisted of a 500 mW 938 nm master oscillator 80. The master oscillator was a tunable external cavity semiconductor laser followed by a tapered amplifier 82 which was made by Toptica. The output of the tapered amplifier was input through lens 84 into the fiber 86. The $M^2$ of the master oscillator was measured to be 2.5 using a Coherent Modemaster, which was consistent with the manufacturer data. Because of the poor $M^2$, only about 200 mW of the master oscillator light could be effectively coupled into the core of the amplifier fiber. The fiber amplifier had 2 stages of 25 m of Nd3+ doped fiber (86,88) each. The first stage (86) was pumped by a 25 W LIMO laser diode 90 with a 0.22 NA and spot size of 200 mm. Optics 92 coupled the pump beam through a dichroic 94 and a short pass filter 96 (cutoff 1 mm), through lens 98 into the output of the first amplifier stage. The short pass filter was positioned to block 1088 nm light from entering the next stage and to prevent 1088 nm light from traversing the dichroic and striking the pump laser. Pump diode failures were observed without this precaution in place, which was attributed to Q-switching at 1088 nm in the event of the loss of a saturating input signal at 938 nm. The first stage provided 10 dB of gain to the coupled signal for an output power at 938 nm of 2 W with no observable 1088 nm light at the output A second nearly identical amplifier stage followed the first stage. 1.4 W of 938 nm from the first stage was coupled by lens 100 into the core of the second fiber 88 after passing through an iris 102 to block light from the cladding. The second stage was pumped with two 25 W LIMO laser diodes 104,106 identical to the diode pumping the first stage. The beams from these diodes were directed by lens 108 and 110 through polarizing beamsplitter 112, through short pass filter 114, and dichroic 116 to be focused into fiber 88 by lens 118. Short pass filter 114 protects the laser diodes 104, 106 from 1088 nm transients. Due to polarization sensitivity of the dichroic and difficulty in simultaneously coupling both pumps into the output of the second stage, only about 35 W of 808 nm light could be coupled into the second stage. The output of the second stage amplifier was measured after passing through an iris 120 to screen cladding light and is plotted in FIG. 6.

The peak output power of the laser at 938 nm was 11 W at 35 W of coupled 808 nm light The slope efficiency of the second stage of the amplifier was 32% and there was no sign of saturation or roll-off. The output was measured with an optical spectrum analyzer and the 1088 nm light without a filter was 40 dB down from the 938 nm peak with a 1 nm resolution bandwidth. The output beam was measured to have an $M^2$ of 1.7 which was attribute to a combination of excitation of the higher order modes by the poor $M^2$ of the master oscillator combined with higher than normal mode-to-mode scatter due to the relatively small cladding diameter. This issue is correctable by shrinking the core slightly.

It could also be fixed by employing an air-clad core with a larger outer glass diameter to stiffen the fiber against microbending [7].

1. P. Zeller and P. Peuser, "Efficient, multiwatt, continuous-wave laser operation on the $^4F_{3/2}$–$^4I_{9/2}$ transitions of Nd:YVO$_4$ and Nd:YAG," Optics Letters 25, 34–36 (2000).

2. P. Dragic and G. Papen, "Efficient amplification using the $^4F_{3/2}$–$^4I_{9/2}$ transition in Nd-doped silica fiber," IEEE Phot Tech. Lett 11, 1593–1595 (1999).

3. J. Dawson, R. Beach, A. Drobshoff, Z. Liao, D. Pennington, S. Payne, L. Taylor, W. Hackenberg, D. Bonaccini, "938 nm Nd-doped high power cladding pumped fiber amplifier," Technical Digest Advanced Solid State Photonics, Feb. 2–5, 2003 paper MD-3.

4. L. Zenteno, J. Minelly, A. Liu, A. Ellison, S. Crigler, D. Walton, D. Kuksenkov, M. Dejneka, "1 W single-transverse-mode Yb-doped double-clad fibre laser at 978 nm," Electronics Letters, vol. 37, pp 819–820 (2001).

5. K. Yla-Jarkko, R. Selvas, D. Soh, J. Sahu, C. Codemard, J. Nilsson, S. Alam, A. Grudinin, "A 3.5 W 977 nm cladding-pumped jacketed air-clad ytterbium-doped fiber laser," OSA TOPS Vol. 83, Advanced Solid State Photonics pp. 203 (2003).

6. C. Giles and E. Desurvire, "Modeling erbium-doped fiber amplifiers," Journal of Lightwave Tech. 9,271–283.

7. M. Fermann, "Single-mode excitation of multimode fibers with ultrashort pulses," Optics Letters 23, 524 (1998).

The above 7 references are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An optical fiber amplifier, comprising:
    a length of silica optical fiber having a core doped with neodymium, a first cladding and a second cladding each with succeeding lower refractive indices, wherein said first cladding diameter is less than 10 times the diameter of said core, wherein the doping level of said neodymium within said optical fiber is chosen so that the small signal absorption for 816 nm light traveling within the core is less than 15 dB/m;
    means for providing an optical signal having a wavelength within the range from 930 nm to 950 nm;
    means for providing pump light having a wavelength within the range of 800 nm to 830 nm;
    means for optically coupling said optical signal into said core; and
    means for optically coupling said pump light into said first cladding of said optical fiber, wherein said optical signal is amplified to produce an amplified signal.

2. The amplifier of claim 1, further comprising means for coupling said amplified signal out of said optical fiber.

3. The amplifier of claim 1, wherein said neodymium is co-doped with germanium, but not phosphorous or aluminum.

4. The amplifier of claim 1, further comprising a first mandrel around which said optical fiber is wrapped, wherein said mandrel comprises a radius R, wherein R is chosen to provide more than 10 dB of total bend induced loss of 1088 nm light propagating in said core and less than 1 dB of total bend induced loss of 930 nm–950 nm light propagating in said core.

5. The amplifier of claim 4, further comprising a second mandrel around which said optical fiber is further wrapped, wherein about one-half of the length of said optical fiber is wrapped around said first mandrel and about one-half of said optical fiber is wrapped around said second mandrel, wherein said second mandrel comprises a radius R, wherein R is chosen to provide more than 10 dB of total bend induced loss of 1088 nm light propagating in said core and less than 1 dB of total bend induced loss of 930 nm–950 nm light propagating in said core.

6. The optical amplifier of claim 1, wherein said optical fiber comprises end faces that are angle cleaved to prevent back-reflections.

7. The optical fiber amplifier of claim 1, further comprising at least one filter operatively placed with respect to said optical fiber to provide optical loss at wavelengths greater than 1000 nm, but little to no loss at wavelengths shorter than 1000 nm.

8. The optical fiber amplifier of claim 1, wherein said core is approximately 30 microns in diameter, has a numerical aperture of 0.06 and a small signal absorption due to the Nd ions of 5–10 dB/m at 810 nm, wherein said first cladding comprises a diameter of 125 microns and a numerical aperture of greater than 0.4.

9. The optical fiber amplifier of claims 1, wherein said core is approximately 20 microns in diameter, has a numerical aperture of 0.06 and a small signal absorption due to the Nd ions of 8–12 dB/m at 810 nm, wherein said first cladding has a diameter of 125 microns and a numerical aperture of greater than 0.4.

10. The optical fiber amplifier of claims 1, wherein said optical fiber does not have circular symmetry because said symmetry is broken by the creation of one or more flat surfaces on the outer diameter of said first cladding.

11. The optical fiber amplifier of claim 1, further comprising a cascaded series of identical optical amplifiers identical to said optical fiber.

12. The optical fiber amplifier of claim 1, further comprising:
    means for providing optical feedback to said amplifier; and
    means for coupling light out of said amplifier.

13. The optical fiber amplifier of claim 1, wherein the signal light has a total optical bandwidth of less than 5 GHz.

14. The optical fiber amplifier of claim 1, further comprising means for cooling said optical fiber to a temperature of less than 200 K.

15. The optical fiber amplifier of claim 1, further comprising means for cooling said optical fiber to a temperature of less than 100K.

16. The optical fiber amplifier of claim 1, wherein said core comprises Nd/Ge/Si, wherein said optical fiber comprises a core to cladding diameter ratio of 1:4, wherein said core has a NA that is less than 0.1 and a cladding NA that is >0.3, wherein the Nd3+ concentration gives an absorption of less than 15 dB/m at 816 nm above the fiber background loss, said amplifier comprising a high reflector at one end of said fiber and an output coupling mirror at the opposite end.

17. The optical fiber amplifier of claim 1, wherein said first cladding comprises a diameter in the range from 100 microns to 2 mm.

18. The optical fiber amplifier of claim 1, wherein said 930 nm to 950 nm signal is pulsed light.

19. A method for amplifying light, comprising:

providing a length of silica optical fiber having a core doped with neodymium, a first cladding and a second cladding each with succeeding lower refractive indices, wherein said first cladding diameter is less than 10 times the diameter of said core, wherein the doping level of said neodymium within said optical fiber is chosen so that the small signal absorption for 816 nm light traveling within the core is less than 15 dB/m;

a step for providing an optical signal having a wavelength within the range from 930 nm to 950 nm;

a step for providing pump light having a wavelength within the range of 800 nm to 830 nm;

a step for optically coupling said optical signal into said core; and a step for optically coupling said pump light into said first cladding of said optical fiber, wherein said optical signal is amplified to produce an amplified signal.

20. The method of claim 19, further comprising a step for coupling said amplified signal out of said optical fiber.

* * * * *